Feb. 26, 1952  A. H. FISKE, JR., ET AL  2,587,304
CRYSTAL PRESSURE GAUGE
Filed Nov. 17, 1948

Inventors:
Augustus H. Fiske, Jr.,
George E. Ledges,
by Richard E. Hosley
Their Attorney.

Patented Feb. 26, 1952

2,587,304

UNITED STATES PATENT OFFICE 2,587,304

CRYSTAL PRESSURE GAUGE

Augustus H. Fiske, Jr., and George E. Ledges, Schenectady, N. Y., assignors to General Electric Company, a corporation of New York Application November 17, 1948, Serial No. 60,602

2 Claims. (Cl. 171—327)

This invention relates to an improved fluid pressure gauge for measuring dynamic pressure changes inside the cylinder of a compressor or the like.

An object of the invention is to provide an improved gauge of the type described which can be introduced into a cylinder head without materially changing the compression ratio. Other objects and advantages will become apparent as the description proceeds.

Figure 1:
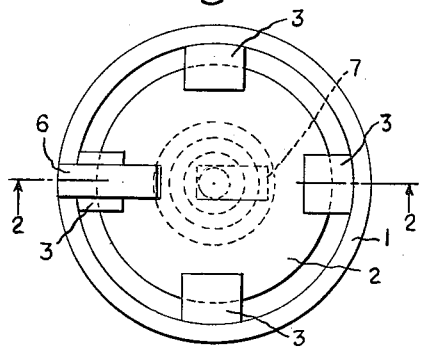
Figure 2:
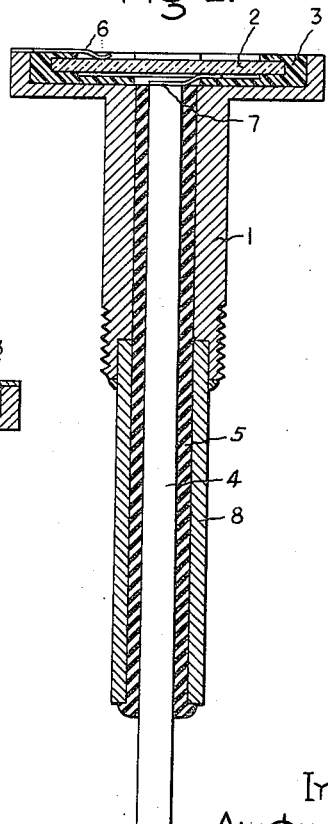
Figure 3:
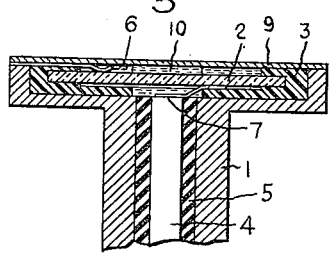

The features of the invention which are believed to be novel and patentable are pointed out in the claims forming a part of this specification. For a better understanding of the invention, reference is made in the following description to the accompanying drawing in which Fig. 1 is a plan view of a preferred embodiment of the invention, Fig. 2 is a vertical section along the line 2—2 of Fig. 1, and Fig. 3 is a similar vertical section showing a modified form of the invention. Where the same part appears in more than one figure of the drawing, it is represented in each case by the same reference numeral.

When an ordinary pressure gauge is introduced into a compressor cylinder head, the gauge occupies a part of the space into which gas would normally be compressed, or, in the case of an externally mounted gauge, adds to the gas compression space, and thereby produces a change in the compression ratio of the compressor. Indications obtained from such a pressure gauge relate to operation of the compressor with the changed compression ratio, rather than to normal operation which it is desired to study. A pressure gauge constructed according to this invention has the form of a small bolt which may replace a valve retainer bolt of the compressor. The pressure gauge is made exactly the same size as the original valve retainer bolt. Therefore, the gauge does not occupy any additional space within the cylinder head, and the compression ratio remains the same as for normal operation.

Refer now to the drawing, which shows a preferred embodiment of the invention. Bolt 1 is the same size as a valve retainer bolt of the compressor, and therefore is adapted to replace such a retainer bolt without changing the compression ratio of the compressor. Bolt 1 has a recessed head and an axial bore as shown. A thin, flat, circular, disc-shaped piezoelectric crystal 2 is supported within the recess parallel to the face of the bolt head by suitable cement 3. Preferably, the crystal is cemented in place at intervals around its circumference, as shown, with spaces between the cemented points so that the fluid under pressure can act upon both faces of the crystal. By subjecting both faces of crystal to the same pressure, the likelihood of breaking crystal is reduced. Crystal 2 may be tourmaline crystal about .375 inch in diameter and .015 inch thick in a typical gauge.

A wire 4 extends through the axial bore of the bolt as shown. Insulation 5 within the bore between the wire and the bolt forms a fluid-tight seal which prevents the escape of the fluid under pressure in the cylinder head, and also electrically insulates wire 4 from bolt 1.

Electrodes in contact with the two opposite large faces of crystal 2 are formed by depositing a thin coating of silver or other metal on each of the large crystal faces. A silver strip 6 provides an electrical connection between the outer face of the crystal 2 and bolt 1. A small platinum spring 7 provides an electrical connection between the inner face of the crystal and wire 4.

The tourmaline crystal 2 is sensitive to changes in volume; and therefore, as pressure within the cylinder head changes, voltage proportional to the dynamic pressure within the cylinder head is produced between the large faces of the crystal. The electrical connections cause this voltage to appear between wire 4 and bolt 1, which will usually be at ground potential. The voltage is measured by connecting wire 4 through a shielded lead to suitable voltage-responsive apparatus, such as a voltage amplifier having a high impedance input and an oscillograph. A brass sleeve 8 is soldered to the end of bolt 1 to shield wire 4 at a suitable distance from the compressor to a point at which a shielded lead may conveniently be attached to the wire.

By applying voltage from this gauge to the vertical deflection input of a cathode ray oscilloscope, and applying a voltage proportional to cylinder volume to the horizontal deflection input, it is possible to display a Pressure-Volume diagram directly on the oscilloscope screen. If a differentiating circuit is connected between the pressure gauge and the vertical input of the oscilloscope, the vertical deflection of the oscilloscope trace is proportional to the rate of change of pressure and provides information of value in studying the action of the compressor valves.

With the form of the invention shown in Figs. 1 and 2 difficulty may sometimes be encountered from the fact that the tourmaline crystal is temperature sensitive. The rapid alternating temperature changes produced by compression of gas within the compressor cylinder may thus cause a false output. This difficulty is overcome in the modification illustrated in Fig. 3.

Refer now to Fig. 3, which is a vertical section similar to that of Fig. 2. The modification comprises covering the recess in the bolt head with a flexible diaphragm 9 to form a closed chamber, and filling this chamber with liquid 10. For example, diaphragm 9 may be a thin sheet of metal, platinum for example, and liquid 10 may be a silicone oil. Diaphragm 9 can be soldered to the bolt head, and liquid 10 can be injected into the chamber with a hypodermic needle inserted through the diaphragm. After the liquid is injected, the needle hole can be closed with a bit of solder.

Since diaphragm 9 is very thin and hence very flexible, any pressure outside the diaphragm is transmitted without substantial change to liquid 10. The liquid, having negligible compressibility, transmits this pressure to the crystal, so that pressures are indicated as previously explained. The diaphragm and liquid act as a heat absorber which prevents rapid temperature change of the crystal and thus eliminates false indications produced by such temperature changes.

Having described the principle of this invention and the best mode in which we have contemplated applying that principle, we wish it to be understood that the apparatus described is illustrative only, and that other means can be employed without departing from the true scope of the invention defined by the following claims.

What we claim as new and desire to secure by Letters Patent of the United States is:

1. In a fluid pressure gauge, the combination of a bolt having a recessed head and an axial bore, a flexible metal diaphragm covering the recess in the bolt head to form a closed chamber, liquid filling such chamber, a flat, circular, disc-shaped piezoelectric crystal cemented within the recess parallel to the face of said bolt head, said crystal being cemented at intervals around its circumference with spaces between the cemented parts so that both sides of the crystal are subject to fluid pressure exerted by said liquid, a wire extending through the axial bore, insulation within the bore between the wire and the bolt forming a fluid-tight seal, and electrical connections between the bolt and one face of the crystal and between the wire and the opposite face of the crystal.

2. In a fluid pressure gauge, the combination of a bolt having a recessed head and an axial bore, a relatively thin flat disk-shaped piezoelectric crystal positioned within the recess with a flat surface thereof parallel to the face of said bolt head, said crystal being secured within the recess at spaced points about the periphery thereof with at least one of the spaces intermediate such points providing access to the side of said crystal adjacent the axial bore whereby both of the flat surfaces of said crystal are exposed to the action of the fluid pressure being measured, an electrical conductor extending through the axial bore, insulation supporting said electrical conductor within said axial bore and forming a fluid tight seal, and electrical connections between said electrical conductor and the flat surface of the crystal adjacent thereto, and to the remaining flat surface of the crystal and said bolt.

AUGUSTUS H. FISKE, Jr.
GEORGE E. LEDGES.

REFERENCES CITED

The following references are of record in the file of this patent:

UNITED STATES PATENTS

| Number | Name | Date |
| --- | --- | --- |
| 2,190,713 | Hintze et al. | Feb. 20, 1940 |
| 2,216,966 | Swift | Oct. 8, 1940 |
| 2,405,226 | Mason | Aug. 6, 1946 |
| 2,452,571 | Clement | Nov. 2, 1948 |
| 2,497,680 | Massa | Feb. 14, 1950 |

OTHER REFERENCES

Pages 27–29 of "Instruments" issue of February 1933.